United States Patent [19]
Fujimoto

[11] Patent Number: 5,629,983
[45] Date of Patent: May 13, 1997

[54] PARALLEL TRANSMISSION THROUGH PLURALITY OF OPTICAL FIBERS

[75] Inventor: Nobuhiro Fujimoto, Kawasaki, Japan

[73] Assignee: Fujitsu Limited, Kanagawa, Japan

[21] Appl. No.: 538,620

[22] Filed: Oct. 31, 1995

Related U.S. Application Data

[63] Continuation of Ser. No. 991,462, Dec. 16, 1992, abandoned.

[30] Foreign Application Priority Data

Dec. 17, 1991 [JP] Japan ................................. 3-333018

[51] Int. Cl.⁶ ........................... H04B 10/12; H04J 3/06
[52] U.S. Cl. ....................... 380/46; 359/158; 359/173; 370/506; 370/515
[58] Field of Search .................................. 359/158, 154, 359/173; 370/105.1, 107; 380/46

[56] References Cited

U.S. PATENT DOCUMENTS 5,056,120 10/1991 Taniguchi et al. .
5,165,077 11/1992 Rokugawa et al. .
5,185,799 2/1993 McNesby et al. .................... 380/50 X
5,274,487 12/1993 Fujimoto et al. .

*Primary Examiner*—Gilberto Barrón, Jr.

[57] ABSTRACT

In one aspect of the present invention, a coding part of a transmitter side codes N series of input data into N+1 series of transmission data so that each of N+1 series of transmission data have frames and have the same transmission rates as those of the input data. For example, a bit transfer unit comprised in the coding part moves i-th bits of series i to the additional series N+1 where i=1 to N and a complement bit insertion unit inserts complements of an (N+1)-th bit of series 1 and (j-1)-th bits of series j into a first bit position of series 1 and j-th bit positions of series j, respectively, wherein J=2 to N. A frame signal insertion unit units alternate frame signal into the series N+1. BSI is secured by this simple construction.

14 Claims, 15 Drawing Sheets

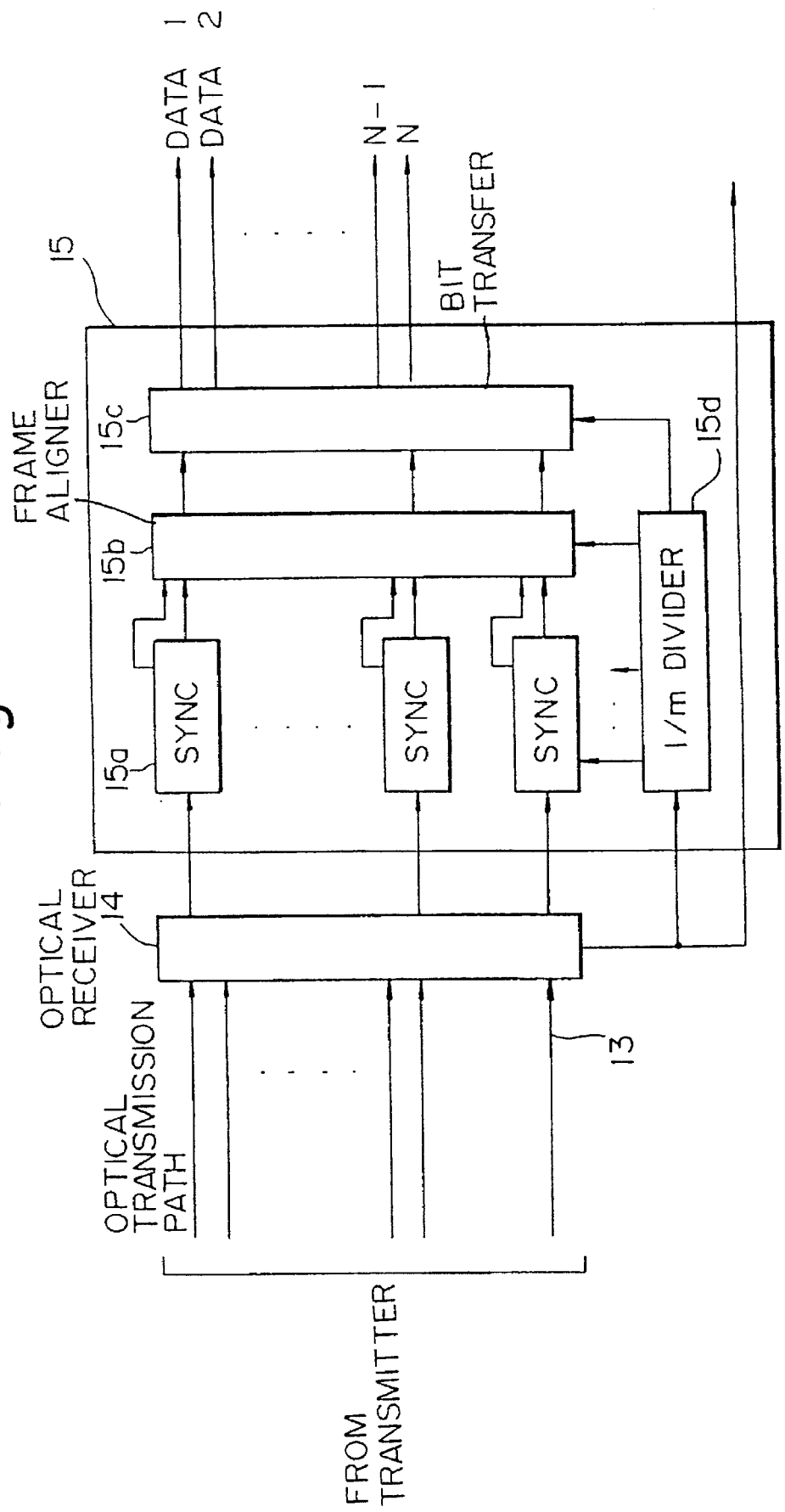

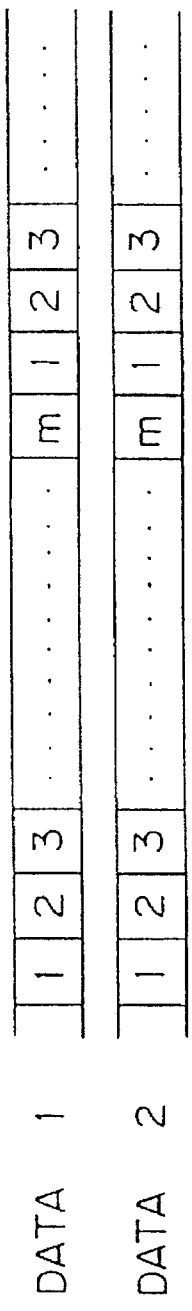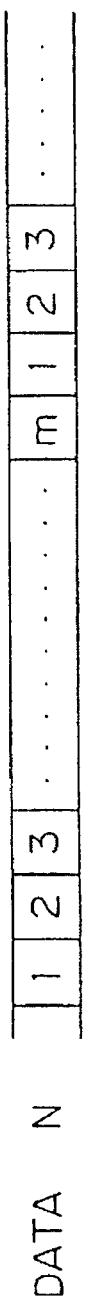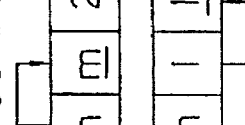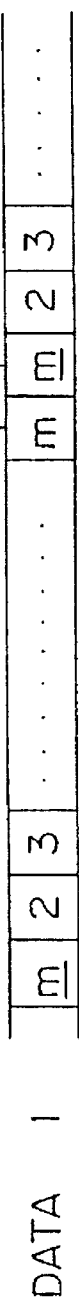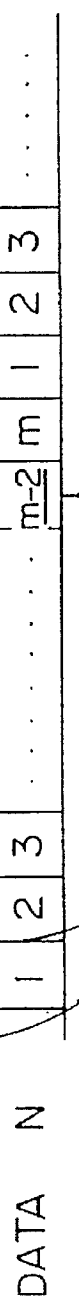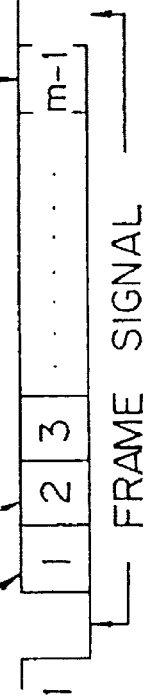

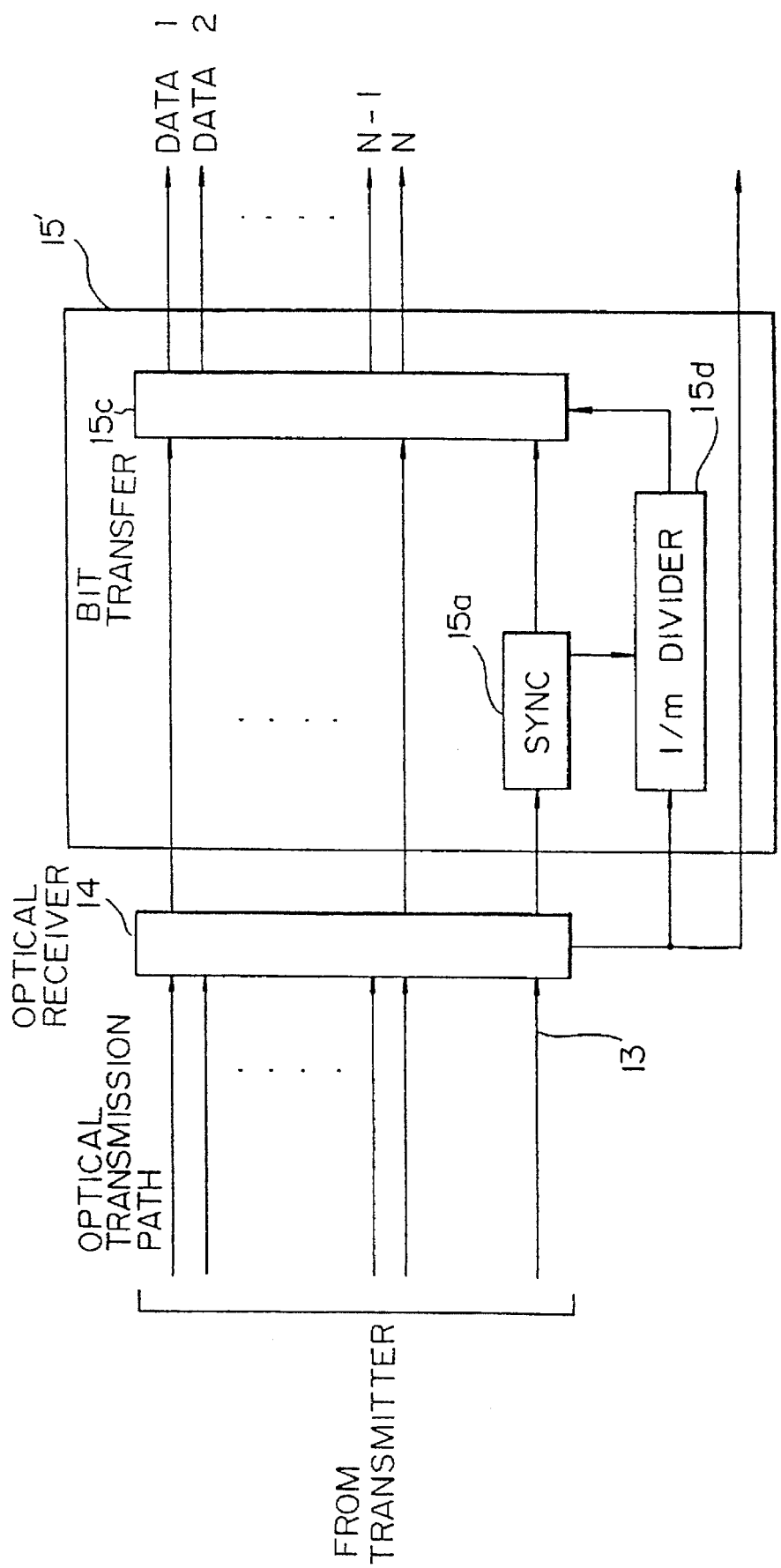

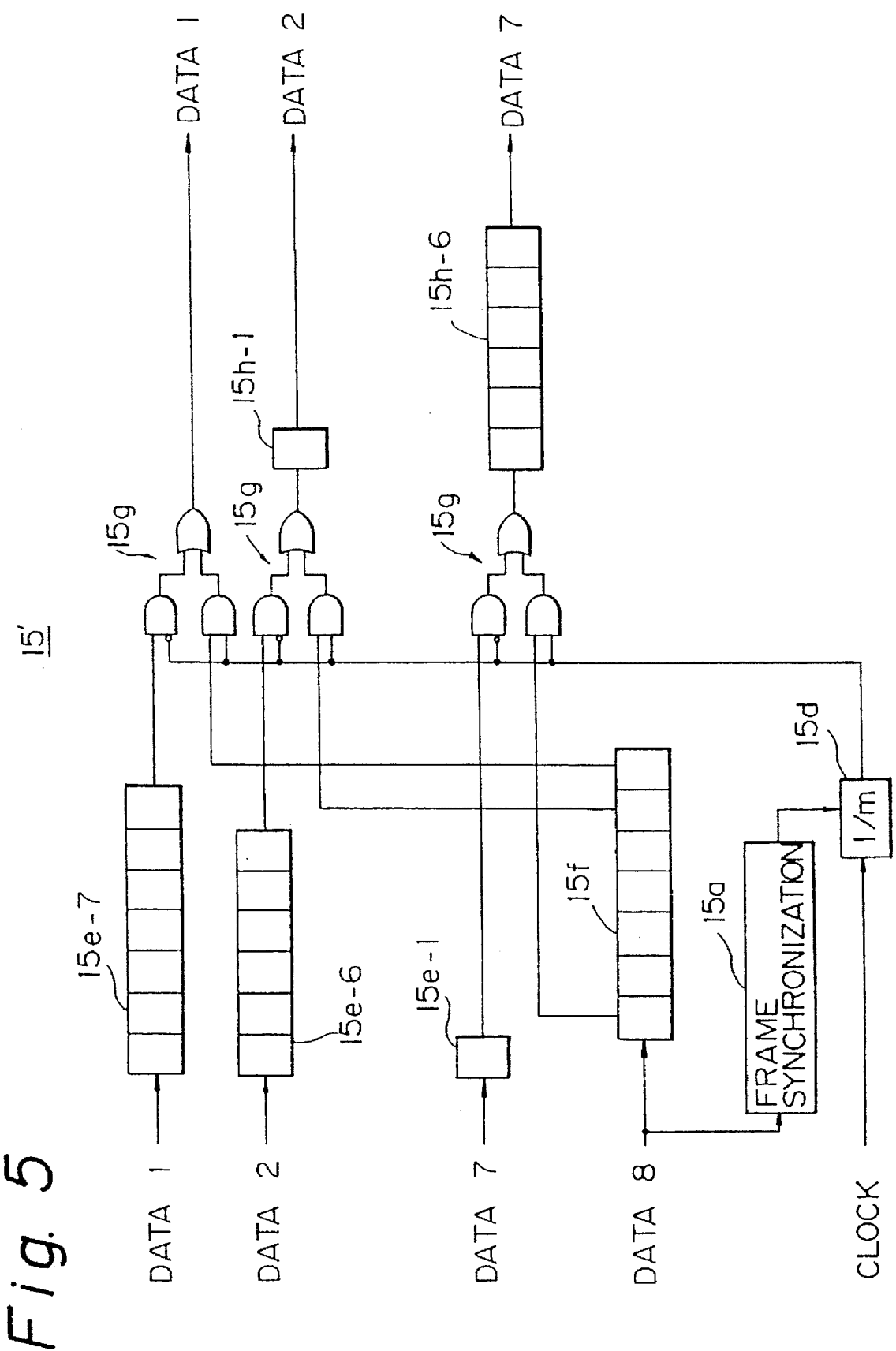

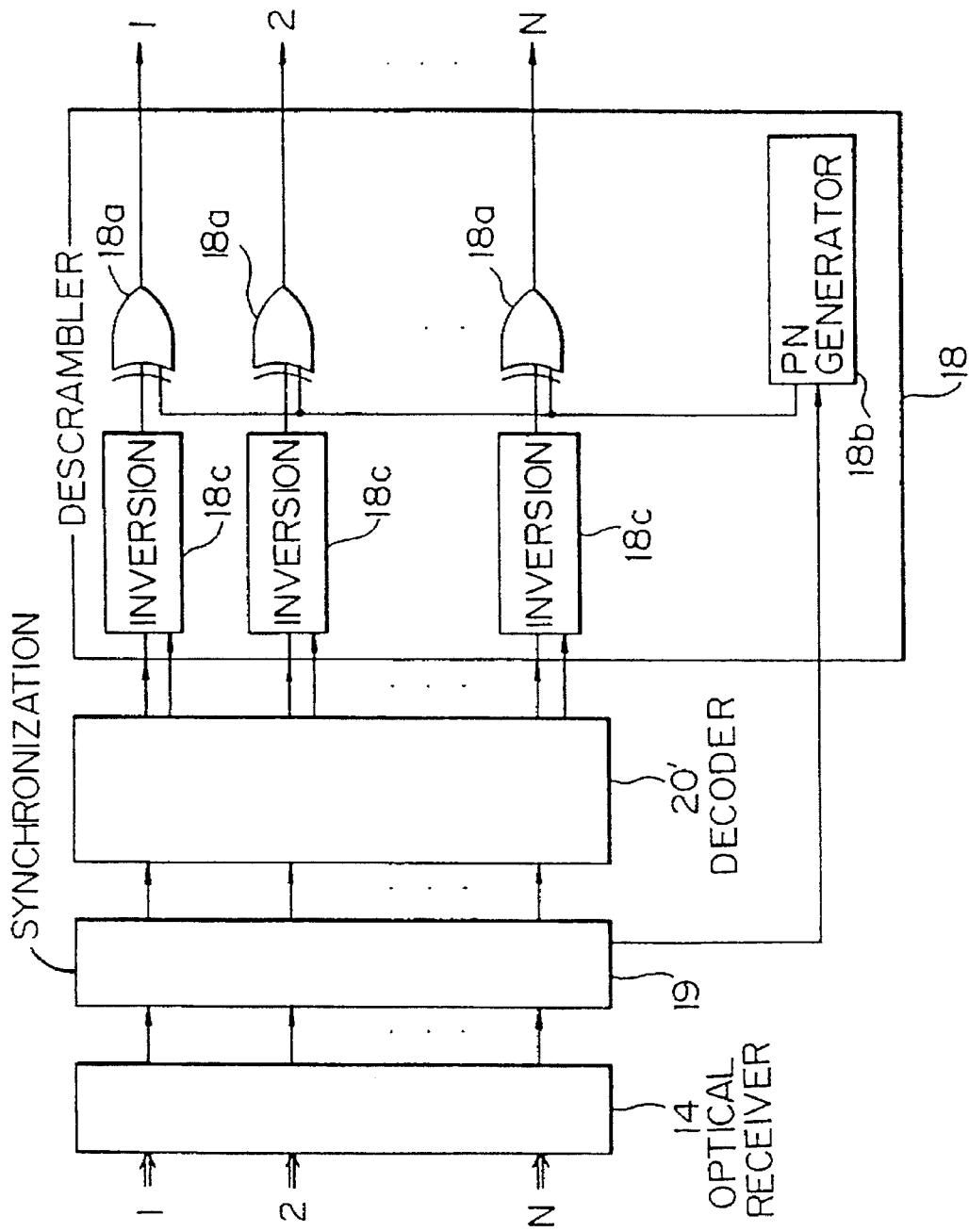

PARALLEL TRANSMISSION THROUGH PLURALITY OF OPTICAL FIBERS

This is a continuation of application Ser. No. 07/991,462, filed Dec. 16, 1992.

BACKGROUND OF THE INVENTION

1. Field of the Invention

The present invention relates to a parallel transmission system, and in particular, to an optical parallel transmission system using a plurality of optical fibers, for communicating between boards or between apparatuses in communication within an information processing system or within an information transmission switching system.

2. Description of the Related Art

Recently, as the speed of information processing becomes higher, the amount of information being processed has increased remarkably. This is mainly due to improvements in the ability of information processors, and therefore, it is also required to improve the speed of communication between boards or between apparatuses.

Communication between boards or apparatuses has so far been performed using metal cables transmitting electrical signals, such as coaxial cables and pair cables. In the coaxial cables or the pair cables, however, an amount of transmitted information, a transmission speed, and a transmission distance tend to be limited by physical factors. Namely, in order to rapidly and correctly transmit a larger amount of information, the cable is required to be thicker. Thus, physical limitations in thickness and weight of the cables arise, and transmission distances are limited because of deterioration of information occurring if the transmission distance is increased.

In addition, flexibility has been required in arrangement of terminal equipment and peripheral equipment within an office, to create a better working environment which has been increasingly desired. However, coaxial cables do not completely satisfy the aforementioned requirement because of the physical limitations and the limitation in the transmission distance.

Furthermore, in broadband aspects of integrated services digital networks (B-ISDN) which will attract much attention as a communication technology in the next generation, a transmission switching system handles not only voice data for telephone sets but also data for pictorial communications and data for facsimile communications. Since these data are multiplexed and transmitted all at once, the system must transmit thousands of times as much data as in the case where only voice data are transmitted. Therefore, metal cables such as the coaxial cables and the pair cables cannot adequately deal with so much data.

An optical parallel transmission technology that is capable of transmitting a large amount of information and that negligibly deteriorates information even over a long transmission distance, has attracted much attention. For example, a 4B6B coding as a coding technology for optical parallel transmissions has been published in "N. Yoshida et al.; A Study on Optical Parallel Transmission Systems; National Convention Record, 1987, IEICE, 2408".

In a system described in the above publication, each serial data constituting continuously transmitted parallel data are partitioned into data segments of four bits, and each of the data segments are coded into balanced code of six bits and converted into optical signals, at a transmitter side. The optical data signals are transmitted with a clock signal. In a receiver side, received optical signals are converted into electrical signals and the six bit codes are sequentially decoded into four bit data.

In the aforementioned system, complex circuits such as a 4B6B coder, recorder, a memory, and a clock rate changing circuit, are required in the transmitter and the receiver sides. Namely, investigations into simplification and lowering of power consumption have not appeared to be sufficient regarding an optical parallel link. The simplification and lowering of power consumption are important subjects in optical parallel transmission systems.

SUMMARY OF THE INVENTION

It is an object of the present invention to provide an optical parallel transmission system having a simple circuit construction and being BSI (Bit Sequence Independent) wherein compensation of circuit characteristics is possible for any input parallel data including intermittent data to perform a correct transmission.

In accordance with the present invention there is provided a parallel transmission system for transmitting a plurality of series of input data from a transmitter side to a receiver side through a plurality of optical transmission lines, comprising means for coding N series of the input data into N+1 series of transmission data so that each of the N+1 series of transmission data have frames and have the same transmission rates as those of the input data in the transmitter side, means for converting the N+1 series of transmission data into N+1 series of optical signals in the transmitter side, means for converting the N+1 series of optical signals into N+1 series of electrical signals of the transmission data in the receiver side, and means for decoding the N+1 series of the transmission data into N series of data to reproduce the N series of the input data in the receiver side.

In accordance with the present invention there is also provided a parallel transmission system for transmitting a plurality of series of input data from a transmission side to a receiver side through a plurality of optical transmission lines, comprising means for scrambling the input data with a first pseudo random noise signal in the transmitter side, means for coding the data scrambled by the scrambling means into transmission codes having frames in the transmitter side, means for converting the transmission codes into optical signals in the transmitter side, means for converting the optical signals into electrical signals of the transmission codes in the receiver side, means for generating a synchronization signal in synchronism with the frames of the transmission codes in the receiver side, means for decoding the transmission codes into the scrambled data in the receiver side, and means for descrambling the scrambled data with a second pseudo random noise signal that is the same as the first pseudo random noise signal and that is in synchronism with the first pseudo random noise signal, to reproduce the input data, in the receiver side.

In accordance with the present invention there is also provided a parallel transmission system for transmitting a plurality of series of input data from a transmitter side to a receiver side through a plurality of optical transmission lines, comprising means for detecting a symbol sequence consisting of the same symbols and being longer than a predetermined length, in the input data, means for inverting a symbol belonging to the symbol sequence to shorten the symbol sequence to within the predetermine length when the longer symbol sequence is detected by the detecting means, means for inserting information about a position of the inverted symbol into an additional series, means for converting series of the input data including the inverted symbol and the additional series including the information into optical signals, means for converting the optical signals into electrical signals of the series of the input data including the inverted symbols and the additional series including the information, and means for inverting the inverted symbols to reproduce the input data based on the information included in the additional series.

BRIEF DESCRIPTION OF THE DRAWINGS

FIGS. 1A and 1B are block diagrams showing an optical parallel transmission system according to an embodiment of the present invention;

FIGS. 2A and 2B are diagrams for explaining an operation of the optical parallel transmission system of FIGS. 1A and 1B;

FIGS. 3A and 3B are block diagrams showing a modification of the optical parallel transmission system of FIGS. 1A and 1B;

FIG. 5 is a logic circuit diagram showing a detailed construction of the decoding part 15 of FIG. 3B;

FIGS. 9A and 9B are block diagrams showing another modification of the optical parallel transmission system of FIGS. 6A and 6B;

DESCRIPTION OF THE PREFERRED EMBODIMENTS

Figure 1A:
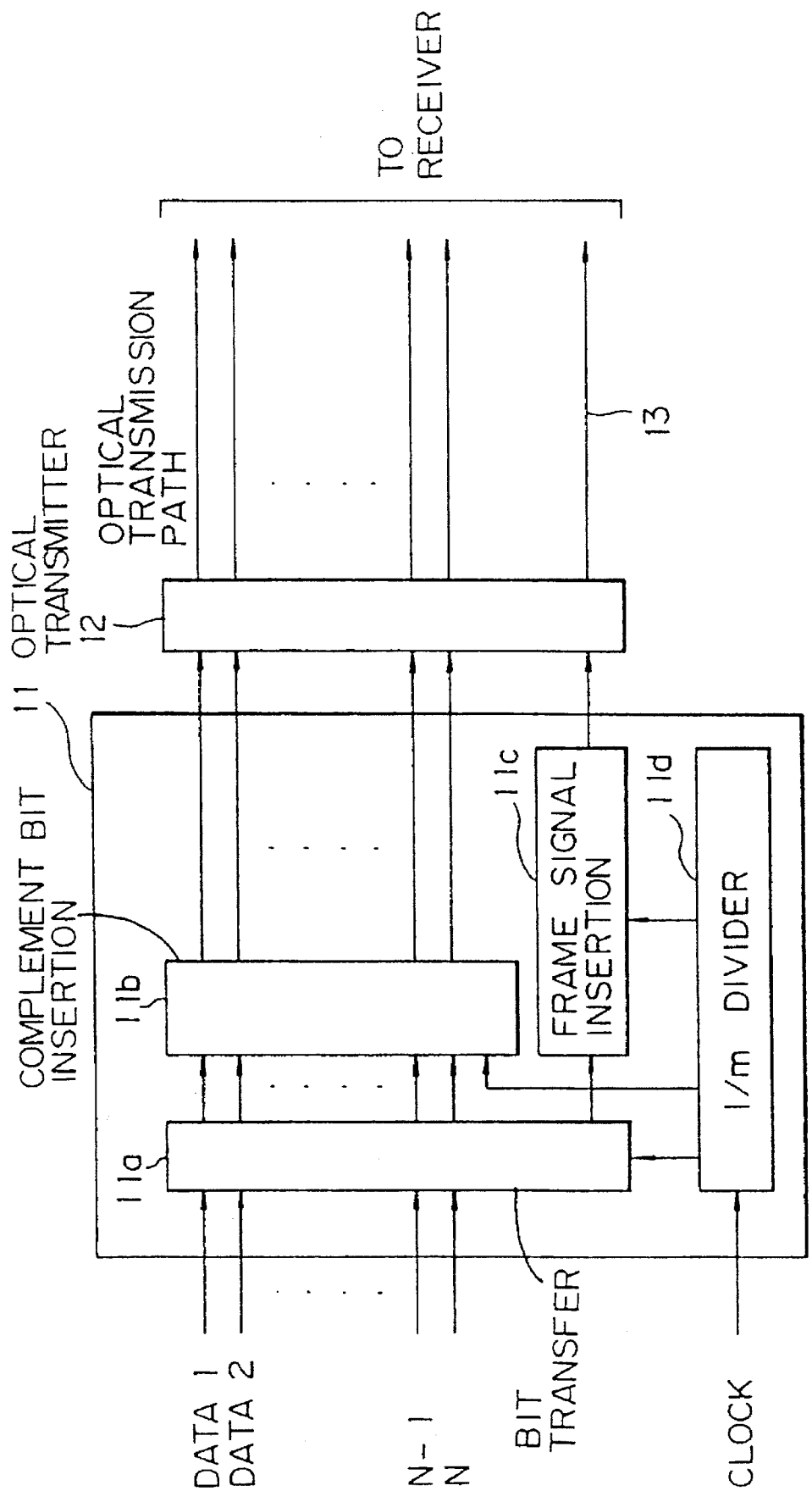

FIGS. 1A and 1B are block diagrams showing an optical parallel transmission system according to an embodiment of the present invention. FIG. 1A shows a construction of a transmitter side and FIG. 1B shows a construction of a receiver side.

The transmitter side of FIG. 1A comprises a coding part 11 and an optical transmitter 12. The receiver side of FIG. 1B comprises an optical receiver 14 and a decoding part 15. The transmitter side is connected to the receiver side through a plurality of optical fibers 13. The coding part 11 converts input data 1 to N into transmission codes adapted for the optical transmission path 13, and the decoding part 15 reproduces the data 1 to N from the transmission codes.

The coding part 11 of FIG. 1A comprises a bit transfer unit 11a, a complement bit insertion unit 11b, a frame signal insertion unit 11c, and a 1/m divider 11d.

The bit transfer unit 11a transfers bits existing at predetermined positions of each of 1 to N series to a new series N+1. The complement bit insertion unit 11b inserts bits that are the complement of the preceding bits into those positions of each of 1 to N series. The frame signal insertion unit 11c inserts frame signals that are alternate signals of "1" and "0" into the N+1 series. The 1/m divider 11d generates a timing signal indicating operation timing of the bit transfer unit 11a, the complement bit insertion unit 11b, and the frame signal insertion unit 11c by frequency-dividing a clock signal by m.

The decoding part 15 of FIG. 1B comprises frame synchronization circuits 15a, a frame aligner 15b, a bit transfer unit 15c and a 1/m divider 15d. The frame synchronization circuits 15a are provided for each of 1 to N+1 series. The frame synchronization circuits 15a generate frame synchronization signals by detecting the complement bits in series 1 to N and the frame signals in series N+1. The frame aligner 15b aligns each series by correcting disagreement of absolute delay time of each series by using the frame synchronization signals. The bit transfer unit 15c replaces the bits that have been transferred to the series N+1 to reproduce original data. The 1/m divider 15d generates a timing signal for operations of the frame aligner 15b and the bit transfer unit 15c by dividing a clock signal recovered in a clock recovery circuit (not shown) included in the optical receiver 14.

FIGS. 2A and 2B are diagrams for explaining an operation of the optical parallel transmission system described with reference to FIGS. 1A and 1B. FIG. 2A shows an example of input data of the coding part 11 of FIG. 1A, and FIG. 2B shows output data of the coding part 11.

As shown in FIG. 2A, the input data are continuously input N-bit parallel data consisting of data 1 to N. To explain, each bit of each series is cyclically numbered from 1 to m (m=N+1) as shown in FIG. 2A. As shown in FIG. 2B, the bit transfer unit 11a moves bit 1 of the series 1, bit 2 of series 2, ... bit i of series i ..., and bit m-1 of series N to the corresponding positions of the series N+1. The complement bit insertion unit 11b inverts bit m of the series 1, bit 1 of series 2, bit i-1 of series i, ..., and bit m-2 of series N, and writes the inverted bits at a position of bit 1 of series 1, a position of bit 2 of series 2, ... a position of bit i of series i, ..., and a position of bit m-1 of series N, respectively. The frame signal insertion unit 11c writes frame signals that are alternate signals at residual bit positions of the series N+1. In the receiver side, the bit transfer unit 15c replaces bits that have been moved to the series N+1 from their original bit position, to reproduce original data.

In the aforementioned embodiment of the present invention, conversion to transmission codes is performed without changing a clock rate on the merit of adding a series N+1. In addition, since complementary codes or alternating frame signals always exist within any m-bit sequence in each series, a length of a sequence consisting of the same symbols is limited to less than m, and thus BSI (Bit Sequence Independence) is secured.

Figure 3A:
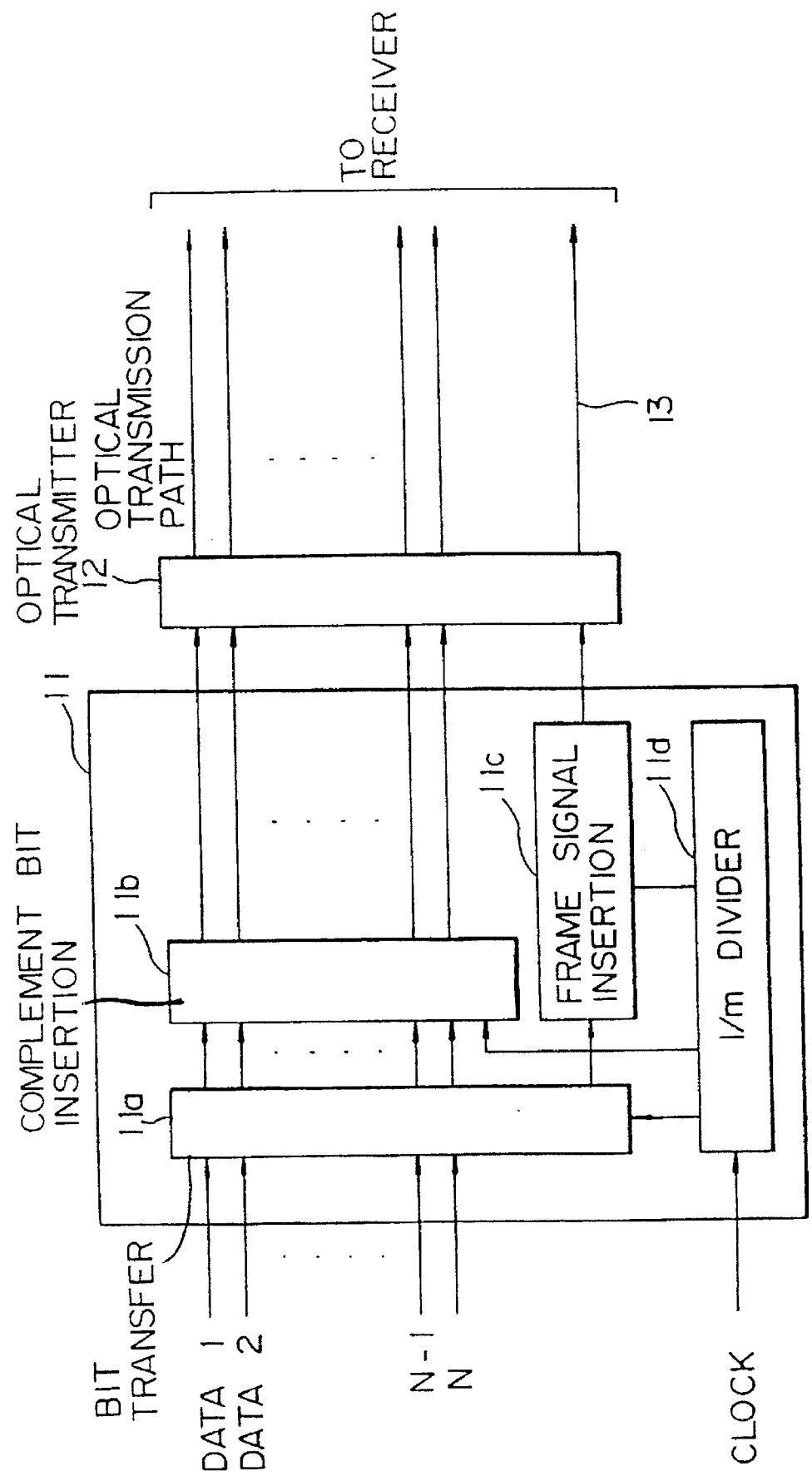

FIGS. 3A and 3B show a modification of the optical parallel transmission system of FIGS. 1A and 1B. A transmitter side of FIG. 3A is the same as FIG. 1A. In FIG. 3B, the frame synchronization circuit 15a is provided only for the series N+1 and the frame aligner is not provided. This construction can be adopted if the difference among absolute delay time of each series is very small.

In the aforementioned embodiment, a clock signal is extracted in a retiming circuit included in the optical receiver 14 of the receiver side. If the clock signal cannot be extracted because of too wide a variation range of a data change speed, the clock signal needs to be transmitted on a separate optical transmission line.

In the aforementioned embodiments, the complement bits are generated from immediately preceding bits, but the complement bits may be generated from a predetermined one of preceding m bits, i.e., the usual mB1C coding may be adopted. In addition, mB1P coding wherein a parity bit of preceding m bits is added, or mB1F coding wherein a frame bit is added to m bits, may be adopted.

Figure 4:
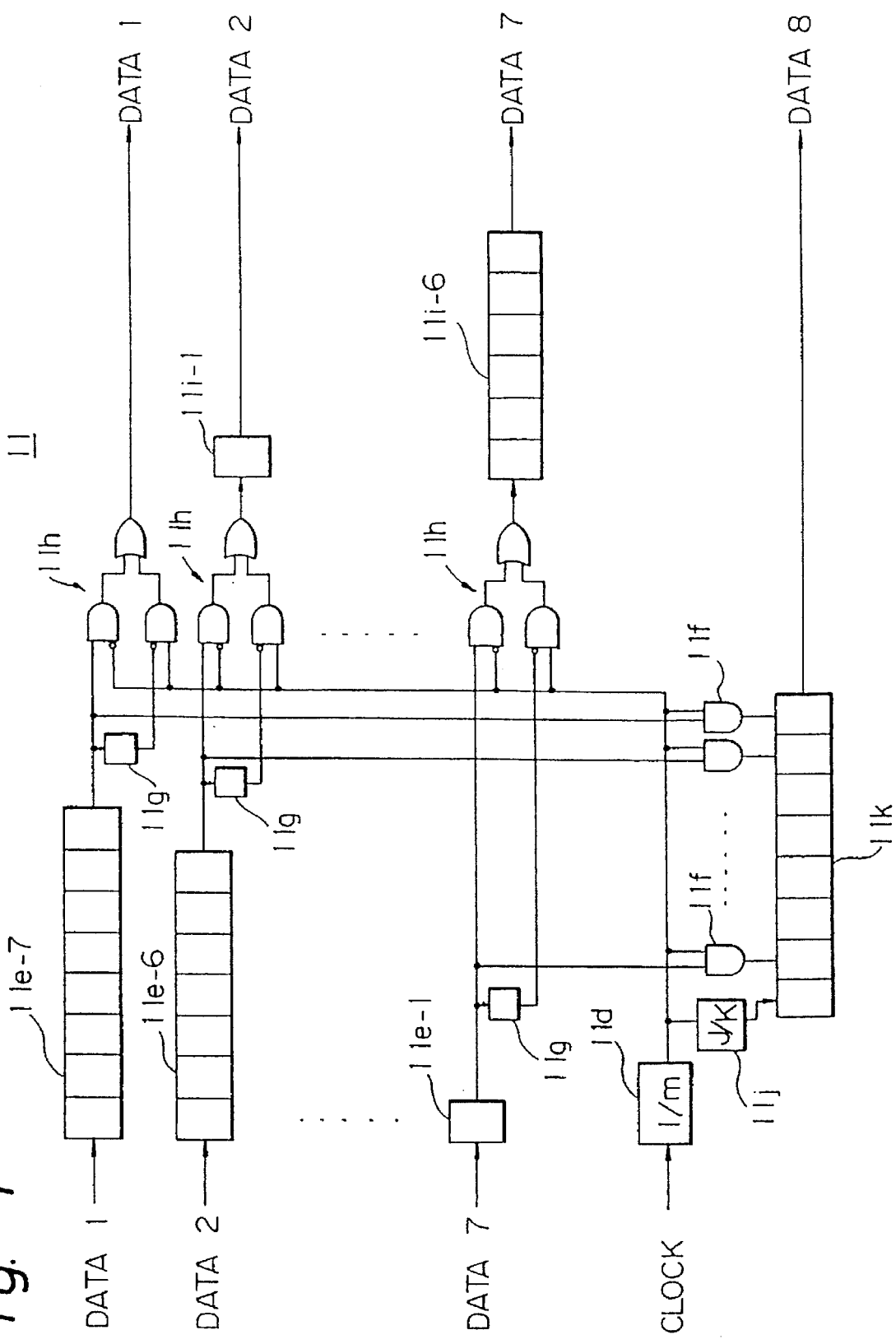
FIG. 4 is a logic circuit diagram showing a detailed construction of coding part 11 of FIG. 1A or 3A.

FIG. 4 shows a detailed construction of the coding part 11 of FIG. 1A or FIG. 3A, in a case where m=8 and N=7. The bit transfer unit 11a is realized by shift registers 11e-1 to 11e-7 having 1 to 7 bit length, respectively, and seven AND gates 11f. The complement bit insertion unit 11b is realized by seven flip-flops 11g, seven AND-OR circuits 11h, and shift registers 11i-1 to 11i-6 having a 1 to 6 bit length, respectively. The frame signal insertion unit 11d is realized by a J/K flip-flop 11j and a shift register 11k having an eight bit length.

FIG. 5 shows a detailed construction of the decoding part 15 of FIG. 3B, in the care where m=8 and N=7. The bit transfer unit 15c is realized by shift registers 15e-1 to 15e-7 having a bit length of 1 to 7, respectively, a shift register 15f having a bit length of 7, seven AND-OR circuits 15g, and shift registers 15h-1 to 15h-6 having a bit length of 1 to 6, respectively.

Figure 6A:
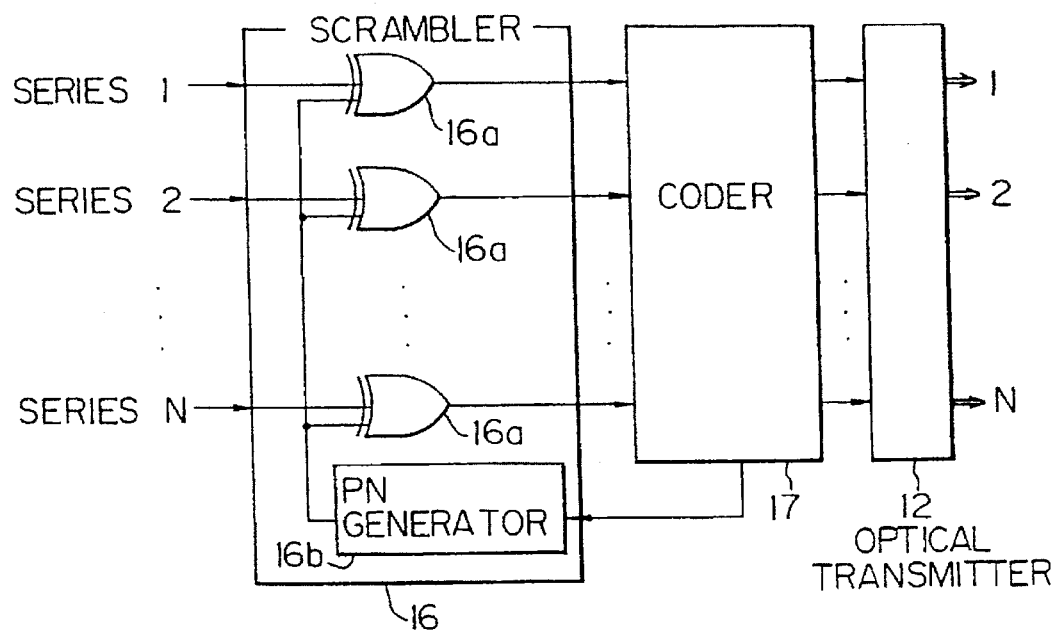
FIGS. 6A and 6B are block diagrams showing an optical parallel transmission system according to another embodiment of the present invention.
Figure 6B:
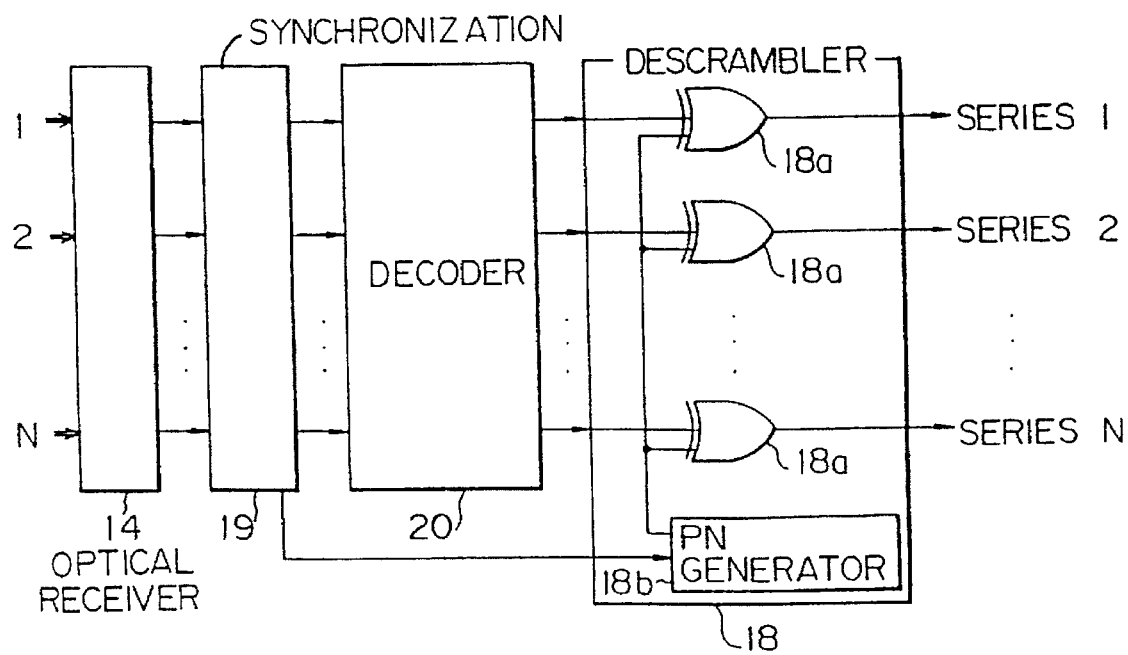

FIGS. 6A and 6B are block diagrams showing an optical parallel transmission system according to another embodiment of the present invention. FIG. 6A shows a transmission side and FIG. 6B shows a receiver side.

The transmitter side comprises a scrambler 16, a coder 17, and the optical transmitter 12. The receiver side comprises the optical receiver 14, a frame synchronization circuit 19, a decoder 20, and a descrambler 18.

The scrambler 16 scrambles N series of data with a PN (pseudo random noise) signal to statistically equalize rates of two logic levels to facilitate the retiming process in the receiver side. The scrambler 16 will be discussed in detail later.

The coder 17 converts input data into transmission codes. Various coding techniques such as known mB1C, mB1P and mB1F may be used in the coder 17. In these cases, a clock rate is multiplied by (m+1)/m.

The frame synchronization circuit 19 in the receiver side performs frame synchronization utilizing the above transmission code format. The decoder 20 decodes received data to reproduce the input data of the coder 17 of the transmitter side. The descrambler 18 descrambles the scrambled data using a PN signal that has the same code sequence as the transmitter side.

The scrambler 16 comprises N EOR circuits 16a and a PN generator 16b. The PN generator 16b generates PN signals in synchronization with a frame signal generated in the coder 17 by being reset by the frame signal. The EOR circuits perform EOR operations between each of input data of series 1 to N and the PN signal.

The descrambler 18 comprises N EOR circuits 18a and a PN generator 18b, similar to the scrambler 16. The PN generator 18b has the same internal construction as the PN generator 16b, and generates the same PN signals in synchronism with a frame signal from the frame synchronization circuit 19. The EOR circuits perform EOR operations between each of the scrambled data and the PN signals, to output descrambled data.

In the embodiment of FIGS. 6A and 6B, the BSI is secured by statistically equalizing rates of two logic levels on the optical transmission path, by scrambling with the PN signal.

Figure 7:
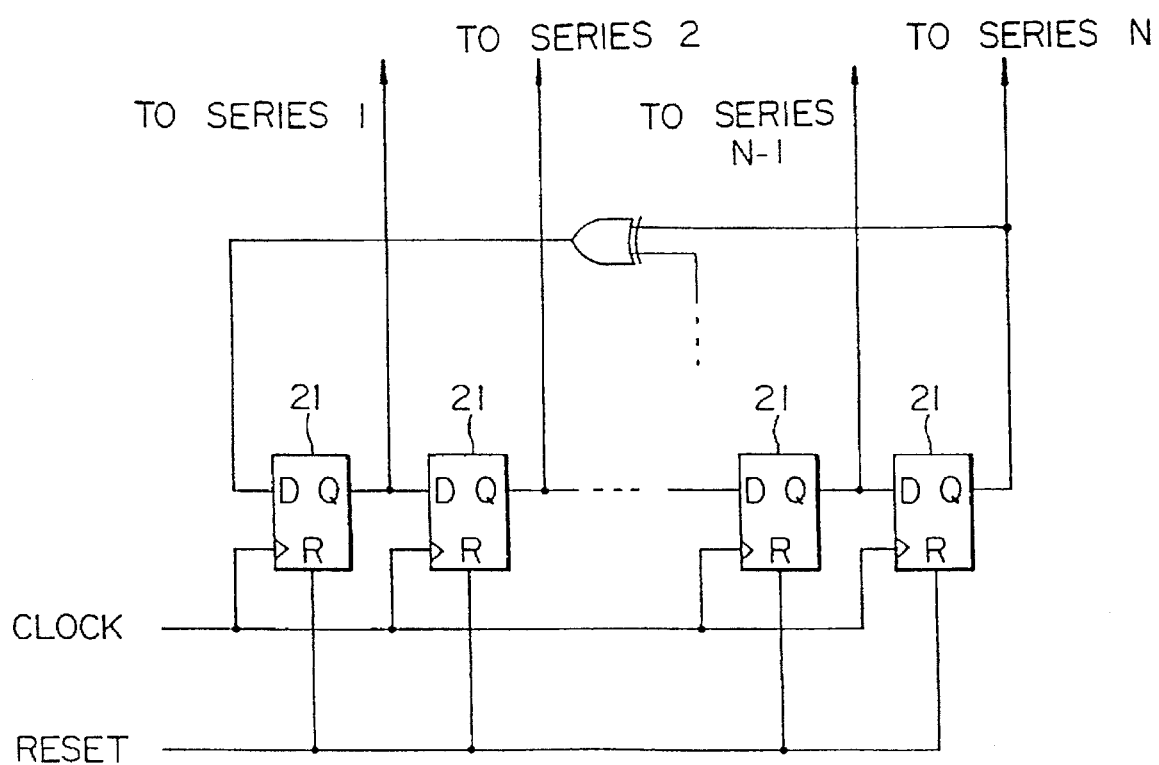
FIG. 7 is a logic circuit diagram showing a detailed construction of a PN generator used in a modification of the optical parallel transmission system of FIGS. 6A and 6B, FIGS. 8A and 8B are block diagrams showing another modification of the optical parallel transmission system of FIGS. 6A and 6B.

FIG. 7 shows a detailed construction of a PN generator used instead of the PN generator 16b or 18b in a modification of the optical parallel transmission system shown in FIGS. 6A and 6B. In this modification, an N-bit parallel PN signal is derived from N flip-flops 21 constituting the PN generator. Each bit of the N-bit parallel PN signal is individually supplied to the inputs of the EOR circuits 16a or 18a.

Figure 8A:
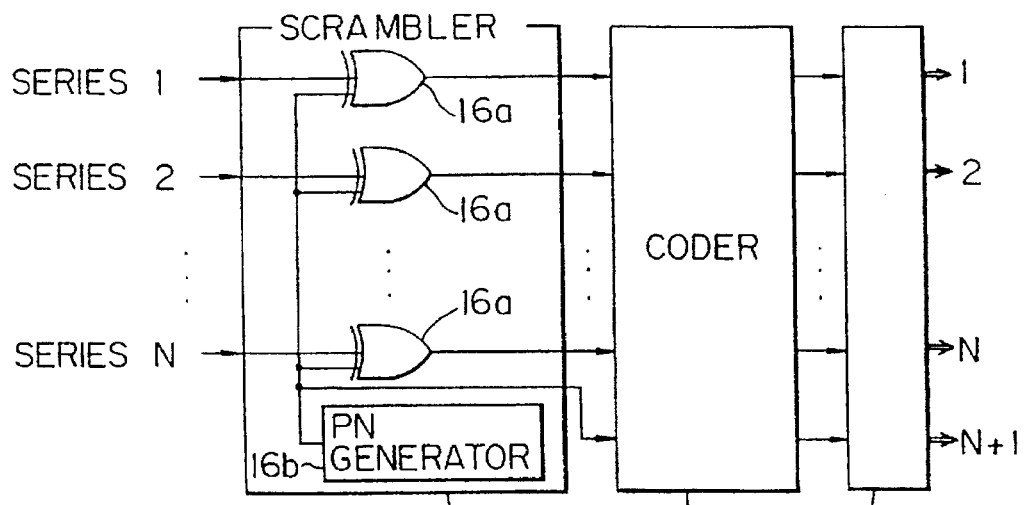
Figure 8B:
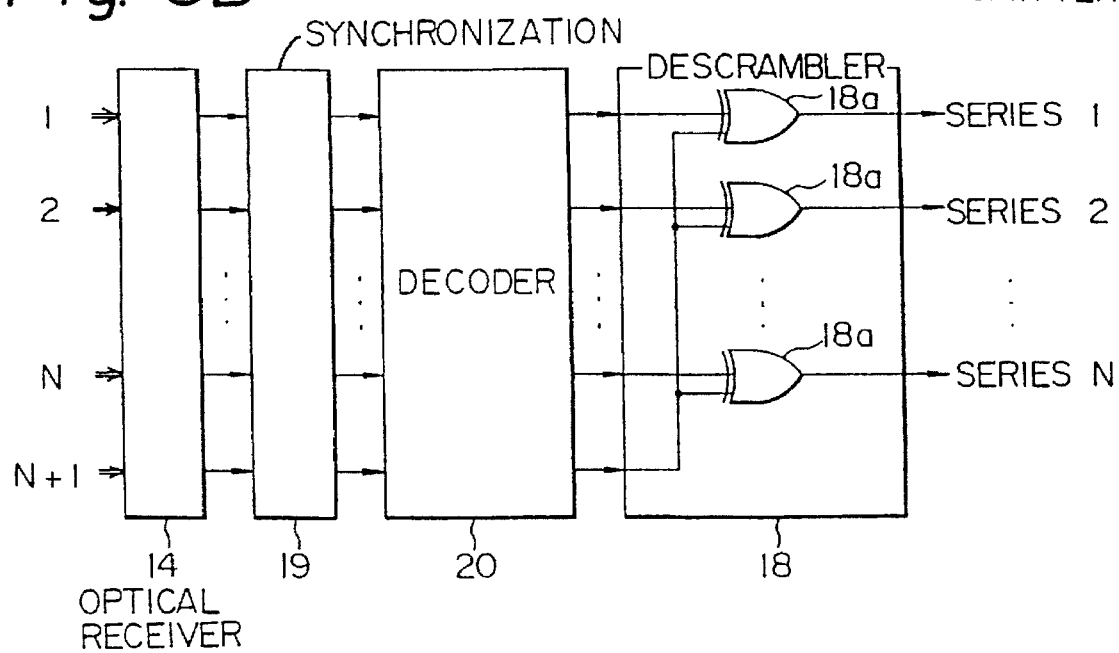

FIGS. 8A and 8B show another modification of the optical parallel transmission system of FIGS. 6A and 6B. In this modification the PN generator is comprised only in the transmitter side, and the PN signal generated in the PN generator 16b is transmitted through another transmission series N+1 with a frame signal to the receiver side. In the receiver side, the descrambler 18 descrambles the data using the PN signal transmitted through the series N+1. In this modification, the PN generator 16b does not need to be reset by the frame signal. The PN signal and the frame signal therefor may be multiplexed into any other series to be transmitted to the receiver side.

Figure 9A:
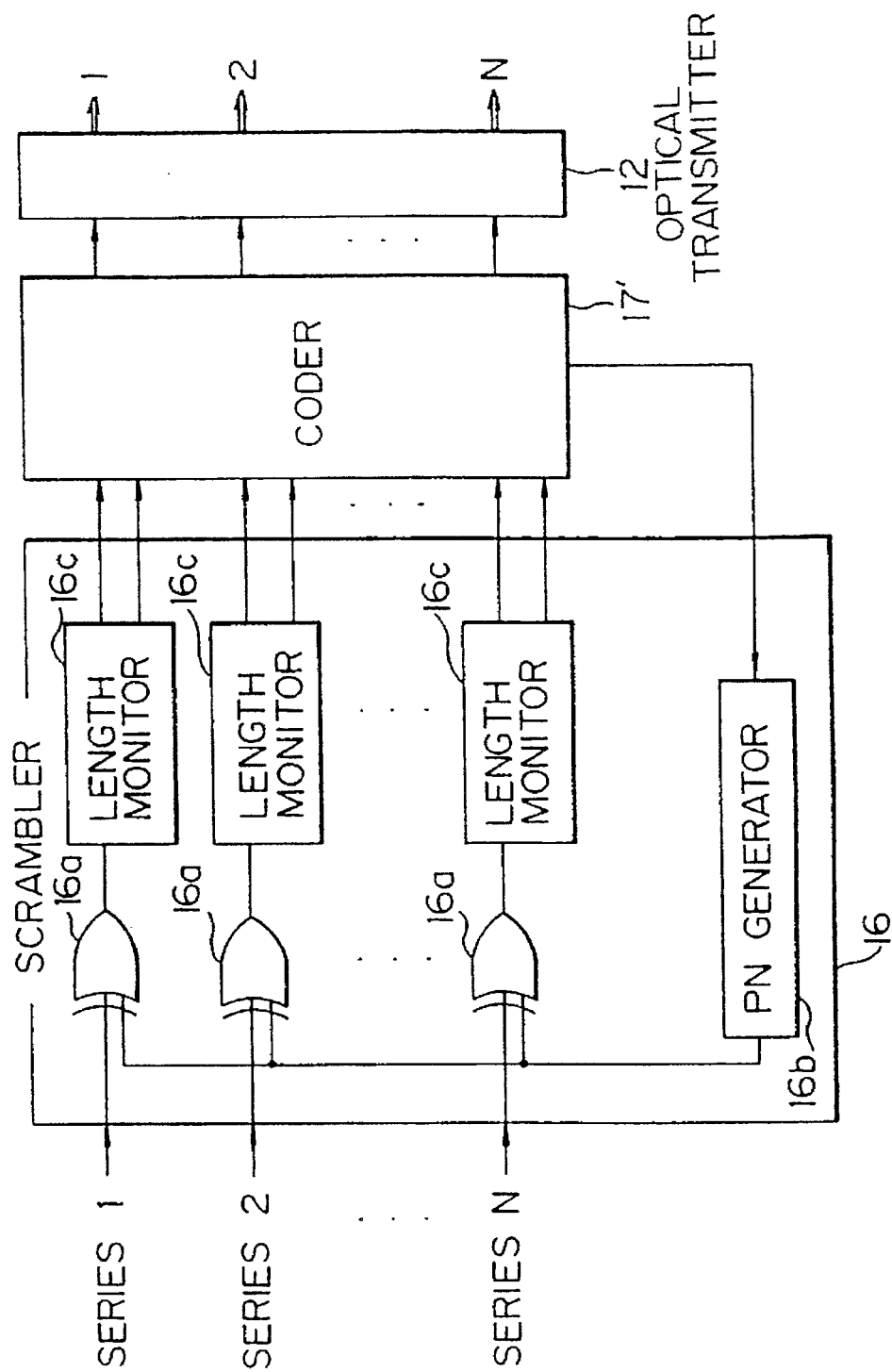

FIGS. 9A and 9B show another modification of the optical parallel transmission system of FIGS. 6A and 6B. FIG. 9A shows a transmitter side and FIG. 9B shows a receiver side.

The scrambler 16 of FIG. 9A comprises length monitor circuits 16c in each series. The length monitor circuits 16C monitor a length of a sequence consisting of the same symbols. If a length monitor circuit 16c detects a sequence longer than a predetermined value, for example, five, the length monitor 16c informs a coder 17' of the detection. The coder 17' carries out a coding process similar to the coder 17 explained before, for example, according to mB1C, mB1P or mB1F. In addition, if informed of the detection of a sequence longer than five, the coder 17' inverts an excess symbol, i.e., the sixth symbol in the above example and multiplexes information as to a position of the inverted symbol into transmission codes.

The receiver side of FIG. 9B comprises a decoder 20' and inversion circuits 18c. The decorder 20' decodes the transmission code similar to the decoder 20 explained before. In addition, the decoder 20' demultiplexes the information as to the position of the inverted symbol from the transmission code. The inversion circuit 18c inverts the symbols according to that information to recover output data of the scrambler 16 of the transmitter side.

Multiplexing of the inverted symbol position is performed in the coder 17', for example, by inverting a C, P or F bit of an mB1C code, mB1P code or mB1F code, respectively, only when a symbol is inverted because of detection of longer sequence. In the decoder 20', when an inverted C, P or F bit is detected, the inverted symbol is reinverted.

In the transmission system of FIGS. 6A and 6B, though the scrambler 16 statistically equalizes rates of two logic levels by scrambling with a PN signal, a low rate of long sequences consisting of the same symbols remains when a sequence of PN signal coincides with a transmission data sequence or the complement thereof. In the modification shown in FIGS. 9A and 9B, the length monitor 16c detects these long sequences and the coder 17' outputs transmission codes wherein the longer sequences are shortened by inverting the excess symbol. The information of the inverted symbol position may be transmitted using an additional N+1 series.

Instead of inverting the excess symbol, the longer sequence can also be shortened by inverting the PN signal output from the PN generator 16b, after the longer sequence is detected. In the receiver side, the PN signal output from the PN generator 18b is inverted according to the position information.

Figure 10:
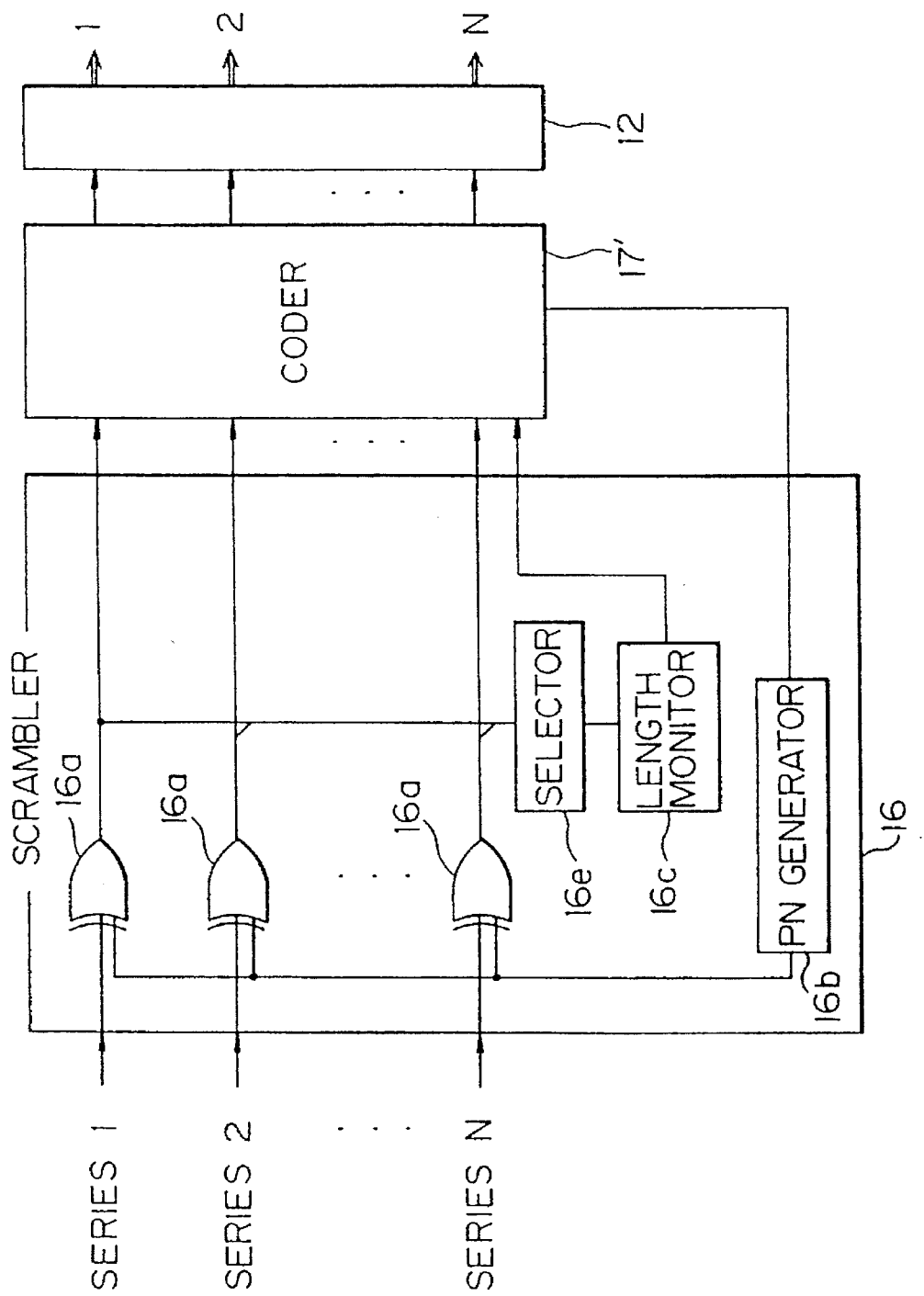
FIG. 10 is a block diagram showing a transmitter side of a modification of the optical parallel transmission system of FIGS. 9A and 9B.

FIG. 10 shows a transmitter side of a modification of the optical parallel transmission system shown in FIGS. 9A and 9B. A receiver side is the same as FIG. 9B. In FIG. 10, the scrambler 16 comprises a single length monitor 16c and a selector circuit 16e. The selector 16e successively switches series that are monitored by the length monitor circuit 16c at constant time intervals.

Figure 11A:
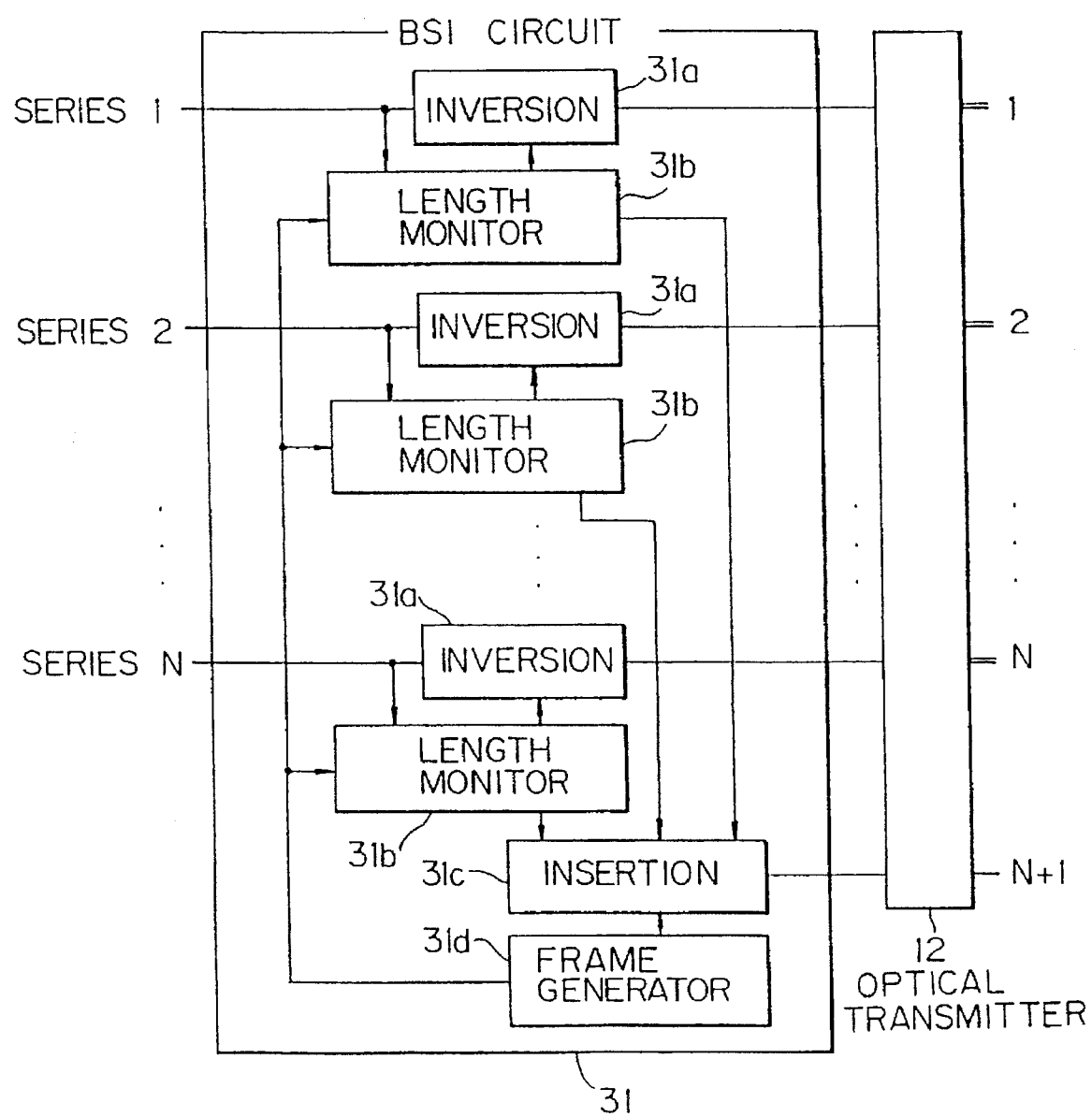
FIGS. 11A and 11B are block diagrams showing an optical parallel transmission system according to another embodiment of the present invention.
Figure 11B:
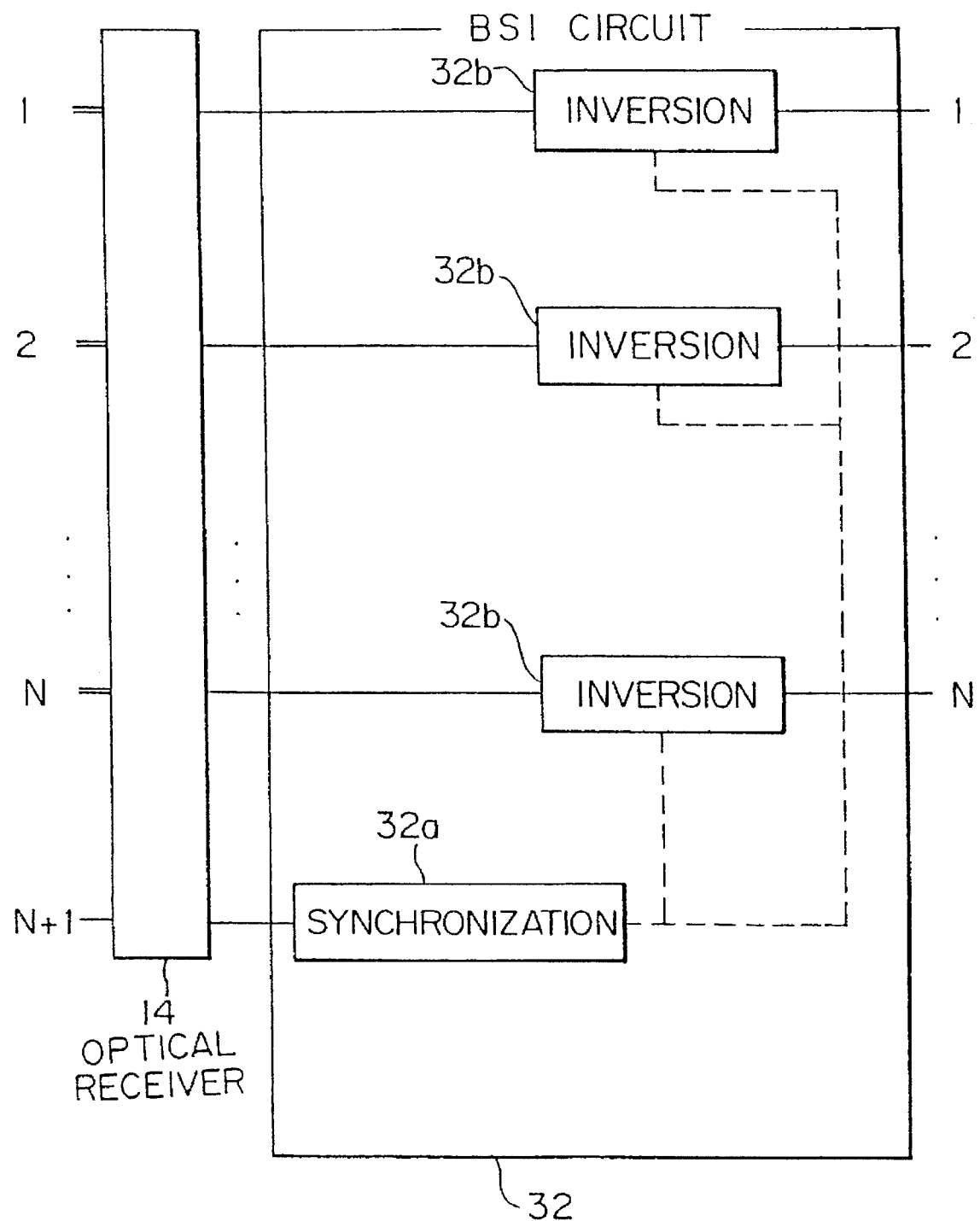

FIGS. 11A and 11B show an optical parallel transmission system according to another embodiment of the present invention.

The transmitter side of FIG. 11A comprises a BSI circuit 31 for the transmitter side and the optical transmitter 12. The receiver side of FIG. 11B comprises the optical receiver 14 and a BSI circuit 32 for the receiver side.

The BSI circuit 31 of the transmitter side comprises length monitors 31b and inversion circuits 31a for each series. The BSI circuit 31 also comprises an insertion circuit 31c and frame generator 31d. The BSI circuit of the receiver side comprises inversion circuits 32b for each series and synchronization circuit 32a.

The inversion circuits 31a invert symbols transmitted on each series, for example, from 0 to 1 or from 1 to 0. The length monitors 31b continuously watch transmitted symbols and decides whether the same symbols continue during more than a predetermined period. If the same symbols continue during more than the predetermined period, the length monitor 31b commands the inversion circuit 31a to invert the last symbol of the sequence. The insertion circuit 31c inserts information as to positions of the inverted symbols into an additional series N+1. The frame generator 31d controls monitoring start and end in the length monitor 31b. The optical transmitter 12 converts electrical signals into optical signals as explained before.

The optical receiver 14 of the receiver side converts the optical signals into electrical signals. The synchronization circuit 32a is provided for synchronization with operations of the transmitter side. Namely, the synchronization circuit 32a performs synchronization with the frame generator 31d of the transmitter side and detects time phase of the information of the inverted symbol position. The inversion circuit 32b again inverts the symbol at the position based on the information of the inverted symbol position detected by the synchronization circuit 32a.

A parallel transmission process in the system shown in FIGS. 11A and 11B is explained below.

N series of electrical signals are input to the BSI circuit 31 of the transmitter side. If a symbol monitor start signal is generated in the frame generator 31d, the length monitors 31b monitor the input data of each series with regard to each symbol, and count bits continuously having the same values. If bits having the same values continue during a predetermined interval, a value of the next bit is referred to. If the value of the next bit is the same as that of the preceding bits, the inversion circuit inverts the value of the next bit. In this case, in the insertion circuit 31c, information about a position of the inverted bit is inserted into an additional series N+1 and other spaces are filled with randomly varying "1" or "0". The aforementioned N+1 series of data is converted from the electrical signals to optical signals in the optical transmitter 12, and is transmitted to the receiver side.

In the receiver side, each received series of signals are converted from optical signals to electrical signals in the optical receiver 14 and are fed to the BSI circuit 32 of the receiver side. The synchronization circuit 32a monitors data of series N+1 and detects frame signals. The synchronization circuit 32a sends the information about the bit position of the inverted bit based on the frame signal to the inversion circuit 32b of the series 1 to N. The inversion circuit 32b monitors input data of each series, and when a bit corresponding to the information about the inverted bit position is input, the corresponding bit is inverted.

As mentioned above, in the optical parallel transmission system, continuation of the same symbols is prevented by a simple construction.

Though monitoring of each series is limited within predetermined periods by the frame generator 31d, the monitoring may always be carried out. In this case, the information about the inverted symbol position is inserted into the series N+1 in synchronization with the bit position of the inverted bit.

In addition, though the monitoring is carried out during a constant time interval instructed by the frame generator 31d, the monitoring may only be carried out with regard to bits before and after the instruction from the frame generator 31d.

I claim:

1. A parallel transmission system for transmitting a plurality of series of input data from a transmitter side to a receiver side through a plurality of optical transmission lines, comprising:

a coding unit for coding N series of the input data into N+1 series of transmission data so that each of N+1 series of transmission data have frames and have the same transmission rates as those of the input data in the transmitter side;

an optical transmitter for converting the N+1 series of transmission data into N+1 series of optical signals in the transmitter side;

an optical receiver for converting the N+1 series of optical signals into N+1 series of electrical signals of the transmission data in the receiver side; and a decoding unit for decoding the N+1 series of the transmission data into N series of data to reproduce the N series of the input data in the receiver side.

2. A parallel transmission system as claimed in claim 1, wherein the coding unit comprises:

a first bit transfer unit for moving bits at predetermined positions of each of the N series of the input data to an additional series N+1;

an additional bit insertion unit for inserting additional bits at said positions of each of the N series to thereby provide the frame in each of the N series; and a frame signal insertion unit for inserting frame signals into the additional series N+1, and wherein the decoding means comprises:

a synchronization unit for generating a synchronization signal in synchronism with the frame of the transmission data; and a second bit transfer unit for replacing the bits moved by the first bit transfer unit based on the synchronization signal.

3. A parallel transmission system as claimed in claim 2, wherein the bit transfer unit moves i-th bits of series i to the additional series N+1 where i=1 to N, and wherein the additional bit insertion unit inserts complements of an (N+1)-th bit of series 1 and (j-1)-bits of series j into a first bit position of series 1 and j-th bit positions of series j, respectively, where j=2 to N.

4. A parallel transmission system as claimed in claim 2, wherein the synchronization unit includes a plurality of synchronization circuits for independently generating synchronization signals in synchronism with each of the frames of the N+1 series, and wherein the decoding means further comprises a bit aligner for aligning the N+1 series based on the synchronization signals.

5. A parallel transmission system as claimed in claim 2, wherein the synchronization unit includes a synchronization circuit for generating a synchronization signal in synchronism with the series N+1.

6. A parallel transmission system for transmitting a plurality of series of input data from a transmission side to a receiver side through a plurality of optical transmission lines, comprising:

a scrambler for scrambling the input data with a first pseudo random noise signal in the transmitter side;

a coder for coding the data scrambled by the scrambler into transmission codes having frames in the transmitter side;

an optical transmitter for converting the transmission codes into optical signals in the transmitter side;

an optical receiver for converting the optical signals into electrical signals of the transmission codes in the receiver side;

a synchronization circuit for generating a synchronization signal in synchronism with the frames of the transmission codes in the receiver side;

a decoder for decoding the transmission codes into the scrambled data in the receiver side; and a descrambler for descrambling the scrambled data with a second pseudo random noise signal that is the same as the first pseudo random noise signal and that is in synchronism with the first pseudo random noise signal, to reproduce the input data, in the receiver side wherein the scrambler includes a PN generator generating the first pseudo random noise signal, and a plurality of first EOR circuits performing EOR operations between the first pseudo random noise signal and each of the series of input data, wherein the descrambler includes a plurality of second EOR circuits performing EOR operations between the second pseudo random noise signal and each of the series of the scrambled data, and wherein the second pseudo random noise signal is obtained by transmitting the first pseudo random noise signal through the optical transmission line.

7. A parallel transmission system for transmitting a plurality of series of input data from a transmission side to a receiver side through a plurality of optical transmission lines, comprising:

means for scrambling the input data with a first pseudo random noise signal in the transmitter side;

means for coding the data scrambled by the scrambling means into transmission codes having frames in the transmitter side;

means for converting the transmission codes into optical signals in the transmitter side;

means for converting the optical signals into electrical signals of the transmission codes in the receiver side;

means for generating a synchronization signal in synchronism with the frames of the transmission codes in the receiver side;

means for decoding the transmission codes into the scrambled data in the receiver side; and means for descrambling the scrambled data with a second pseudo random noise signal that is the same as the first pseudo random noise signal and that is in synchronism with the first pseudo random noise signal, to reproduce the input data, in the receiver side, said scrambling means includes a first PN generator generating the first pseudo random noise signal in synchronism with the frames of the transmission codes, and a plurality of first EOR circuits performing EOR operations between the first pseudo random noise signal and each of the series of input data, and wherein the descrambling means includes a second PN generator generating the second pseudo random noise in synchronism with the synchronization signal generated by the synchronization signal generating means, and a plurality of second EOR circuits performing EOR operations between the second pseudo random noise signal and each of the series of the scrambled data, wherein the scrambling means further includes means for monitoring a length of a sequence consisting of the same symbols in the scrambled data, wherein the coding means inverts a symbol to shorten the sequence within a predetermined length if the length monitoring mean detects a sequence longer than the predetermined length, and wherein the descrambling means further includes means for inverting the symbol inverted by the coding means.

8. A parallel transmission system as claimed in claim 7, wherein the length monitoring means includes a plurality of length monitor circuits monitoring each series of the scrambled data.

9. A parallel transmission system as claimed in claim 7, wherein the length monitoring means includes a length monitor circuit and a selector selecting one series of the scrambled data to be monitored by the length monitor circuit.

10. A parallel transmission system for transmitting a plurality of series of input data from a transmitter side to a receiver side through a plurality of optical transmission lines, comprising;

a detector for detecting a symbol sequence consisting of the same symbols and being longer than a predetermined length, in the input data;

a first inverter for inverting a symbol belonging to the symbol sequence to shorten the symbol sequence to within the predetermined length when the longer symbol sequence is detected by the detector;

an inserter for inserting information about a position of the inverted symbol into an additional series;

an optical transmitter for converting series of the input data including the inverted symbol and the additional series including the information into optical signals;

an optical receiver for converting the optical signals into electrical signals of the series of the input data including the inverted symbols and the additional series including the information; and a second inverter for inverting the inverted symbols to reproduce the input data based on the information included in the additional series.

11. A transmission apparatus for transmitting a plurality of series of input data to a plurality of optical transmission lines, comprising:

means for coding N series of the input data into N+1 series of transmission data so that each of N+1 series of transmission data have frames and have the same transmission rates as those of the input data; and means for converting the N+1 series of transmission data into N+1 series of optical signals.

12. A receiver apparatus for receiving N+1 series of optical signals generated from N series of input data through a plurality of optical transmission lines, comprising:

an optical receiver which converts the N+1 series of optical signals into N+1 series of electrical signals of transmission data; and a decoder which decodes the N+1 series of the transmission data each of which have frames and have the same transmission rates as those of the input data into N series of data to reproduce the N series of the input data.

13. A parallel data transmitter for transmitting a plurality of series of input data to a receiver side through a plurality of optical transmission lines, comprising:

a coder which converts N series of the input data into N+1 series of transmission data having frames and the same transmission rates as those of the input data;

an optical signal transmitter which converts the N+1 series of transmission data into N+1 series of optical signals and transmits to the optical transmission lines.

14. A parallel transmission receiver for receiving N+1 series of optical signal data from a transmitter side through a plurality of optical transmission lines, said transmitter side including means for coding N series of input data into N+1 series of transmission data, each of said N+1 series of transmission data having frames and having the same transmission rates as the transmission rates of said input data; and means for converting the N+1 series of transmission data into N+1 series of optical signals in the transmitter side;

said transmission receiver comprising:

an optical signal receiver which converts the N+1 series of optical signals into N+1 series of electrical signals of the transmission data; and a decoder which decodes the N+1 series of electrical signals of the transmission data into N series of data to reproduce the N series of the transmitter side input data.

* * * * *